United States Patent Office 3,431,068
Patented Mar. 4, 1969

3,431,068
METHOD OF PREPARING ALKALI METAL HALIDES
George A. Burk, Bay City, Mich., assignor to The Dow Chemical Company, Midland, Mich., a corporation of Delaware
No Drawing. Filed June 27, 1966, Ser. No. 560,878
U.S. Cl. 23—89     10 Claims
Int. Cl. C01d 3/12, 3/10, 3/00

ABSTRACT OF THE DISCLOSURE

Alkali metal halides substantially free of halates are prepared by reacting elemental bromine or iodine with an alkali metal hydroxide in a liquid saturated alcohol or ketone or a liquid saturated aldehyde.

---

This invention relates to a method of preparing alkali metal halides in which the halogen atom has an atomic weight of at least 79.9 and more particularly pertains to a method of preparing said alkali metal halides by reacting an alkali metal hydroxide with an elemental halogen in a liquid, saturated aliphatic or alicyclic alcohol or ketone, or a saturated aliphatic aldehyde.

Alkali metal bromides and iodides when prepared from the alkali metal carbonate or hydroxide and elemental bromine or iodine in aqueous systems are usually contaminated with considerable quantities of bromates or iodates, which require special treatment for their separation from the bromide or iodide or, in the alternative, the halates are subjected to a reducing step with a metal such as iron, thus making the halide difficult to recover and also adding another contaminant in the form of a metal compound.

One proposed method of avoiding the formation of halates describes a reaction of ammonium hydroxide and elemental bromine to form $NH_4Br$ and then by methathesis with an alkali metal carbonate, converting the $NH_4Br$ to the alkali metal bromide. In this reaction and a corresponding reaction where iodine is employed, it is necessary to exercise extreme caution to avoid the preparation of explosive mixtures.

According to the process of this invention, alkali metal hydroxides either singly or in mixtures, are reacted with elemental iodine or bromine in a liquid alkanol, cycloalkanol, a liquid, saturated aliphatic or alicyclic ketone, or a liquid, saturated aliphatic aldehyde, to obtain the corresponding alkali metal halide with mere traces of halate salts. If mixtures of alkali metal hydroxides are used, the end product will be a mixture of alkali metal halides. The reaction can be effected over a temperature range of from about 0° C. to reflux temperature of the mixture. At the more elevated temperature the halogen may vaporize, but it is condensed and returned to the reaction mixture during reflux.

The proportion of reactants should be substantially stoichiometric, but it is generally preferred to have a slight molar excess, up to 10–20 mole percent, of the alkali metal hydroxide.

An advantage of the process of the invention is that no halate is formed, and therefore no separation or purification step is needed.

Another advantage is that no reduction procedure to convert halate to halide is necessary.

A further advantage is that anhydrous alkali metal halides can be produced directly.

Another advantage is that the alkali metal bromides and iodides are sparingly soluble in the liquid media in which the reaction is carried out. It is thus possible to select an organic liquid which has a very low solubilizing ability for the alkali metal halide and thus minimize the losses that usually occur during crystallization steps. Representative organic solvents which can be employed include alkanols of from 1 to about 8 carbon atoms. The alcohol can be primary, secondary or tertiary. Cyclic alcohols include cyclohexanol and lower alkyl substituted derivatives thereof. Typical ketones which can be used are acetone, methyl ethyl ketone, methyl propyl ketone, methyl butyl ketone, cyclohexanone, lower alkyl substituted cyclohexanones, and other ketones having from about 3 to about 8 carbon atoms. Aldehydes which can be used are acetaldehyde, propionaldehyde, butyraldehyde and linear or branched chain saturated aliphatic aldehydes having from 2 to about 8 carbon atoms. All the solvents specifically mentioned above are unsubstituted. When open chain organic solvents are employed, the reaction can be run either under anhydrous conditions or in the presence of water. However, with cyclohexanol or cyclohexanone the reaction should be run under anhydrous conditions.

The preferred organic solvent is methanol because of its ready availability, low cost and because it does not enter into side reactions which consume the halogen.

The examples which follow are intended to illustrate the invention, but not to limit it. All parts and percentages are by weight unless otherwise specifically indicated.

EXAMPLE I

One tenth mole (25.4 g.) of iodine was added to 200 ml. of isopropanol and reacted with 14.5 g. of 85% aqueous KOH. This amount of KOH is about a 10% molar excess over that required to react with the $I_2$. The temperature varied between 23° and 55° C. The reaction was complete in one-half hour. At the end of this period the excess KOH was neutralized with 3 g. HI, which was added as a 55 weight percent aqueous solution. The KI is relatively insoluble in isopropanol, so that most of the salt was present as a precipitate. On filtration and washing with isopropanol, 32 g. of solid were recovered. The solid analyzed 96% KI, 2.2% water, .15% $KIO_3$ and .12% KOH. On diluting the isopropanol filtrate with about 4 volumes of water, 1.0 g. of $CHI_3$ was obtained. Complete evaporation of the aqueous isopropanol yielded an adidtional 3 g. of KI. The overall yield of KI based on the elemental iodine added was 91%.

EXAMPLE II

To a mixture of 200 ml. isopropanol and 63.5 of $I_2$ were added 125 ml. LiOH solution containing 12.5 g. LiOH. The temperature of this mixture rose to 35° C. After 20 minutes the reaction was complete. On filtration, dilution with water and a second filtration, 9.5 g. of $CHI_3$ were recovered. The filtrate was then evaporated until it reached a temperature of 160° C. On cooling, 68 g. of solids were obtained. The solids analyzed 77.2% LiI, 22.3% $H_2O$ and 2.1% $Li_2CO_3$. At most, a mere trace of lithium iodate was formed.

When this run was repeated at 80° C. for 15 minutes, 11 g. of $CHI_3$ and 75.5 g. of other solids were obtained. The latter analyzed 69.0% LiI, 29.1% water, and 1% $Li_2CO_3$. The LiI yield was 78.5%. No lithium iodate was detected in the LiI.

EXAMPLE III

To a mixture of 300 ml. isopropanol and 65.3 g. $I_2$ were added 13.0 g. $LiOH \cdot H_2O$ as a solid. The mixture was refluxed for 14 hours, after which 9.8 g. of additional $LiOH \cdot H_2O$ were added. Refluxing was continued for two more hours. 3.7 g. of $Li_2CO_3$ were recovered as a precipitate. The filtrate was distilled under reduced pressure until a temperature of 110° C. was reached. The residue was then filtered to yield 5.2 g. $CHI_3$. The liquid was subjected to further evaporation at atmospheric pressure until a temperature of 185° C. was reached. On cooling, a solid mass weighting 63.5 g. was obtained. This analyzed 90.3% LiI, 7.7% water and .03% LiOH. No iodate or free iodine was present.

Repeating this run by adding all the LiOH·H$_2$O and I$_2$ into 200 ml. of isopropanol at one time and stopping the reaction after 45 minutes and thereafter immediately diluting with about 800 ml. of water resulted in the recovery of 9 g. of CHI$_3$. Evaporation of 5/6 of the filtrate to a temperature of 160° C. yielded 62 g. of a solid which was free of iodate. The solid contained 1.4% Li$_2$CO$_3$, 71.6% LiI and the remainder was water.

EXAMPLE IV

To one-fourth mole of I$_2$ (63.5 g.) in 200 ml. methanol heated to 65° C. was added gradually over a half-hour period .52 mol of LiOH·H$_2$O. No CHI$_3$ was formed in this reaction. Small amounts of Li$_2$CO$_3$ and LiIO$_3$ were present as a precipitate. The mixture was filtered, diluted with water and then the liquid was evaporated. From this reaction 57.4 g. of LiI were recovered.

EXAMPLE V

A solution of 63.5 g. I$_2$ in 300 ml. methyl ethyl ketone was heated to reflux (80–85° C.) and .52 mol of LiOH·H$_2$O was added. The reaction was complete in about an hour after the addition of the alkali. The mixture was then evaporated until the residue had a temperature of 175° C. On cooling to room temperature, 112 g. of a flaky, crystalline solid was formed.

The crude salt analyzed 58% LiI. No LiIO$_3$ could be detected in the salt. On dilution of a portion of the solid with large amounts of water, no CHI$_3$ was detected.

EXAMPLE VI

To a solution of 0.25 mol of I$_2$ in 250 ml. methyl ethyl ketone at reflux temperature were added, in about half-hour, 125 ml. aqueous LiOH containing .52 mol of the alkali. The mixture separated into two layers. The lower aqueous layer was concentrated until it had a boiling temeparture of 163° C. On cooling, 94 g. of solid formed. This analyzed 95% LiI·3H$_2$O, which represents a 97.5% yield of LiI on the iodine used.

This run was repeated at 28–45° C. The lower aqueous layer was concentrated until a temperature of 195° C. was reached. On cooling, a solid mass weighing 81.5 g. formed. The solid analyzed 76.5% LiI, representing 93% of the iodine used.

EXAMPLE VII

One-fourth mol (63.5 g.) I$_2$ was dissolved in 150 ml. cyclohexanol and heated to 80° C. Solid LiOH·H$_2$O was added incrementally over a period of about half-hour. The reaction was maintained at a temperature of 80–110° C. for three hours. The reaction mixture was then cooled and diluted with about 25 volumes of methylene chloride. Sixty-nine parts of solid containing 31 parts LiI separated as a precipitate. The filtrate was evaporated to dryness and 25 additional parts of LiI were obtained.

Small amounts of Li$_2$CO$_3$ were formed, but no lithium iodate could be detected.

EXAMPLE VIII

To a solution of .52 mol LiOH in 300 ml. methanol .25 mol bromine was added over a period of about half-hour, while maintaining the reaction mixture at reflux tempeature. The methanol was then distilled until a residue temperature of 123° C. was reached. A solid mass weighing 67 g. was recovered. This analyzed 64.8% lithium bromide representing a 100% yield on the bromine added. No bromate was found in the mixture.

The substitution of other alkali metal hydroxides for K or Li yields results which are substantially similar to those described above. Also, the reaction proceeds equally well if an aliphatic aldehyde is substituted for the ketones or alcohols having the described carbon length or those of the specific examples.

I claim:
1. A method of preparing alkali metal halides of reduced halate content from alkali metal hydroxides and elemental halogen selected from the group consisting of bromine, and iodine comprising reacting at least one of said hydroxides and at least one halogen, as defined, in a member selected from the group consisting of liquid saturated aliphaitc and cycloaliphatic alcohols and ketones or liquid, saturated aliphatic aldehydes.
2. The method of claim 1 in which the halogen is bromine.
3. The method of claim 1 in which the halogen is iodine.
4. The method of claim 1 in which the alkali metal hydroxide is LiOH.
5. The method of claim 1 in which the alkali metal hydroxide is KOH.
6. The method of claim 1 in which a small amount of water is present and the organic ingredient is an aliphatic compound.
7. The method of claim 1 in which the organic solvent is isopropanol.
8. The method of claim 1 in which the organic solvent is methanol.
9. The method of claim 1 in which the organic solvent is methyl ethyl ketone.
10. The method of claim 1 in which the alcohol contains from 1 to 8 carbon atoms.

References Cited

UNITED STATES PATENTS

| | | | |
|---|---|---|---|
| 1,918,622 | 7/1933 | Meulen | 23—89 |
| 2,968,526 | 1/1961 | Verdieck et al. | 23—89 |
| 3,132,068 | 5/1964 | Behrman | 23—89 XR |
| 3,278,260 | 10/1966 | Hermann | 23—89 |
| 3,307,922 | 3/1967 | Goodenough et al. | 23—312 |

FOREIGN PATENTS 533,002  11/1956  Canada.

EDWARD STERN, *Primary Examiner.*

U.S. Cl. X.R.

23—312